United States Patent [19]

Holtrop

[11] Patent Number: 4,867,044
[45] Date of Patent: Sep. 19, 1989

[54] JAM RESISTANT FLUID POWER ACTUATOR FOR BALLISTIC-DAMAGE TOLERANT REDUNDANT CYLINDER ASSEMBLIES

[75] Inventor: John W. Holtrop, Ridgecrest, Calif.

[73] Assignee: The United States of America as represented by the Secretary of the Navy, Washington, D.C.

[21] Appl. No.: 674,901

[22] Filed: Nov. 26, 1984

[51] Int. Cl.$^4$ ............................................. F16J 10/02
[52] U.S. Cl. .................... 92/169.1; 92/171.1; 220/414; 156/172; 138/172
[58] Field of Search ............. 92/110, 128, 146, 169.1, 92/171; 156/172, 175; 220/3, 71, 73, 414; 138/131, 139, 150, 153, 172, 174, 109

[56] References Cited

U.S. PATENT DOCUMENTS

| | | | |
|---|---|---|---|
| 2,429,426 | 10/1947 | Phillips et al. | 92/110 X |
| 2,714,331 | 8/1955 | Plante | 92/110 X |
| 2,739,571 | 3/1956 | Hall | 121/38 |
| 2,743,703 | 5/1956 | Miller | 92/110 X |
| 2,843,153 | 7/1958 | Young | 138/55 |
| 3,168,853 | 2/1965 | Prince | 92/110 X |
| 3,457,841 | 7/1969 | Tregaskiss | 92/110 X |
| 3,566,748 | 3/1971 | Mahler | 91/411 |
| 3,596,344 | 8/1971 | Kreider | 29/419 |
| 3,598,021 | 8/1971 | Langland et al. | 92/169 |
| 3,650,182 | 3/1972 | Phillips | 92/128 |
| 3,703,125 | 11/1972 | Paliukonis | 92/85 |
| 3,826,172 | 7/1974 | Dawson | 89/36 A |
| 3,843,010 | 10/1974 | Morse et al. | 220/3 |
| 3,884,127 | 5/1975 | Simmons | 92/151 |
| 3,886,849 | 6/1975 | Roberts et al. | 92/168 |
| 3,918,351 | 11/1975 | Finke | 91/418 |
| 3,957,416 | 5/1976 | Kaempen | 156/161 X |
| 3,986,438 | 10/1976 | Wittren | 92/110 X |
| 3,995,080 | 11/1976 | Cogburn et al. | 428/35 |
| 4,118,262 | 10/1978 | Abbott | 156/175 |
| 4,143,583 | 3/1979 | Bauer et al. | 91/1 |
| 4,157,181 | 6/1979 | Cecka | 273/80 R |
| 4,296,677 | 10/1981 | Little et al. | 91/510 |
| 4,297,976 | 11/1981 | Bruni et al. | 123/193 CP |
| 4,300,439 | 11/1981 | Degnan et al. | 92/146 |
| 4,685,384 | 10/1987 | Dirkin et al. | 92/166 |
| 4,697,499 | 8/1987 | Dirkin et al. | 92/171 X |

FOREIGN PATENT DOCUMENTS 199147  6/1923  United Kingdom ................. 92/169

Primary Examiner—Robert E. Garrett
Assistant Examiner—George Kapsalas
Attorney, Agent, or Firm—Stephen J. Church; Melvin J. Sliwka; William C. Townsend

[57] ABSTRACT

A hydraulic actuator having redundant cylinder assemblies, each assembly being of lightweight and economical construction in having a relatively thin tubular wall reinforced to withstand hydraulic pressure by a layer of resin reinforced filament, the thickness and the material of the wall being such that petals formed from the wall by projectile penetration are sheared by engagement with a piston of the assembly as this piston is moved, together with an actuated element, by the piston of the other assembly.

1 Claim, 2 Drawing Sheets

JAM RESISTANT FLUID POWER ACTUATOR FOR BALLISTIC-DAMAGE TOLERANT REDUNDANT CYLINDER ASSEMBLIES

BACKGROUND OF THE INVENTION

1. Field of the Invention

The subject invention pertains to expansible chamber devices. More particularly, this invention pertains to such devices having plural, unitarily mounted cylinders having a liner retained by closure associated means. The subject invention also pertains to ordnance; more particularly, it pertains to the shape and composition of a projectile defeating element.

2. Description of the Prior Art

It is known to provide resistance to damage, such as ballistically caused damage by projectile penetration in combat aircraft, in a hydraulic actuator, by the use of redundant cylinder assemblies, so that in the event of damage to one assembly the other assembly can continue to actuate the element. Such an actuator is particularly advantageous in a combat aircraft in which penetration of an actuator by a projectile must be anticipated and in which failure may result in loss of the aircraft.

However, the mere provision of a plurality of cylinder, assemblies is not always effective in providing continued actuation because, in the event of damage to one assembly, the damage may deform a cylinder wall, jamming the actuator even though another assembly is undamaged. A particularly serious form of such damage in combat aircraft is due to penetration of a hydraulic cylinder wall by a projectile, resulting in "petals," which are leaf-like portions of the wall surrounding the opening formed by the projectile as it pierces the wall and which extend into the path of a piston therein.

It is known to alleviate this problem by an actuator in which each cylinder assembly has a tubular inner liner in which the corresponding piston moves this liner being relatively thin and/or of relatively weak material so that petals are sheared off by piston movement. Since such a liner is necessarily weak, it cannot resist the forces generated by hydraulic pressure in normal operation of the actuator. It is therefore necessary to surround the liner by a suitable pressure resisting structure, typically steel.

It is also known to alleviate the problem of such jamming by penetration caused petals in redundant cylinder hydraulic actuators by use of frangible pistons and other elements slotted and scored so as to break when urged into engagement with such a petal from a conventional heavy metal cylinder wall.

In addition, it is known to provide pressure vessels of lightweight construction and resistant to shattering when punctured by utilizing a metal liner, which prevents leakage of the vessel contents and is wrapped with resin impregnated filament to withstand the forces generated by pressure within the vessel, these forces varying so that the elastic limit of the metal liner is continually exceeded. Such vessels, insofar as known to the applicant, are static devices.

SUMMARY OF THE INVENTION

The subject jam resistant actuator has a thin cylindrical tube and cylinder heads slideably fitted therein and retained by a layer of resin impregnated filament wrapped about the tube and the heads.

It is an object of the invention to provide an actuator resistant to jamming by projectile penetration and which is relatively light in weight and is simple to manufacture of relatively inexpensive materials.

BRIEF DESCRIPTION OF THE DRAWINGS

Other objects, advantages and novel features of the invention will become apparent from the following detailed description of the invention when considered in conjunction with the accompanying drawings wherein.

DESCRIPTION OF THE PREFERRED EMBODIMENTS

First Form

Figure 1:
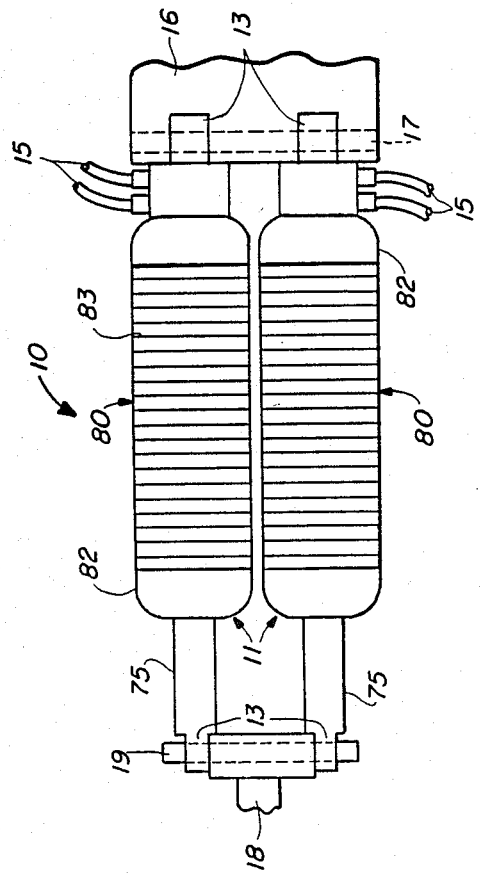
FIG. 1 shows a first form of hydraulic actuator.

In FIG. 1 is shown a jam resistant hydraulic actuator 10 having a pair of substantially identical hydraulic cylinder assemblies 11. Assemblies 11 are of lightweight, permanently assembled construction. Assemblies 11 are linearly extendable and contractible and have opposite mechanical terminations or connections 13. Assemblies 11 are for use with fluid at a predetermined pressure supplied from and returned to independent supply systems, each having a pair 15 of conduits connected to the corresponding assembly 11. Assemblies 11 are utilized with a fixed element 16 connected by a pivot 17 to one termination 13 of each of the assemblies and with a moveable element 18 connected by a pivot 19 to the other termination 13 of assemblies 11 so that assemblies 11 contract and extend together when either or both are suitably pressurized.

Figure 2:
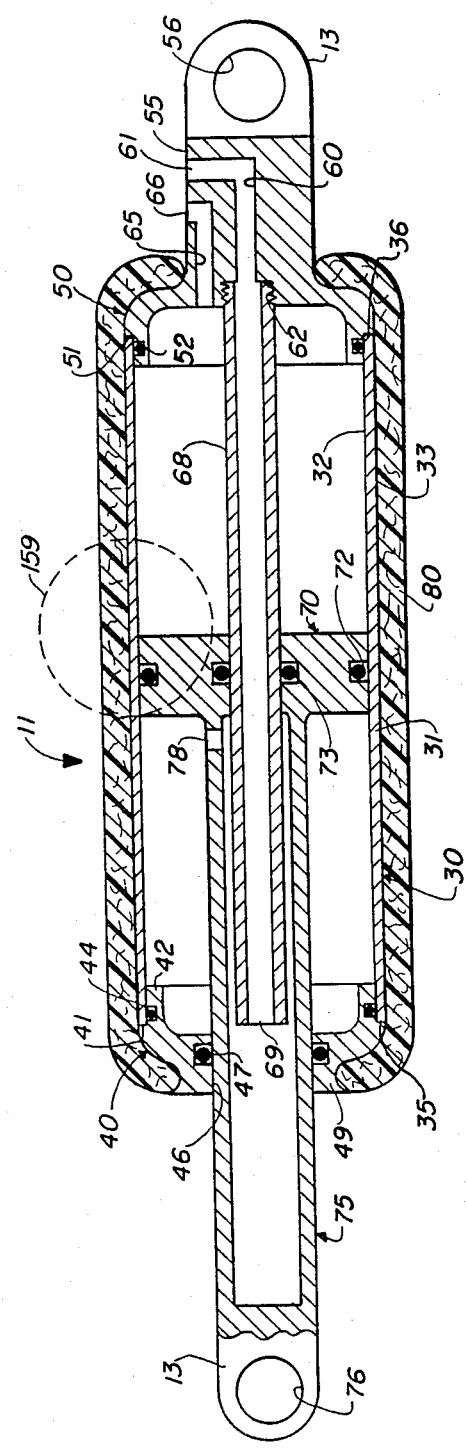
FIG. 2 is a longitudinal section of a cylinder assembly similar to one of the cylinder assemblies of FIG. 1.

Referring to FIG. 2, each assembly 11 has a cylindrical tube 30 having a wall 31, an interior cylindrical surface 32, an exterior cylindrical surface 33, a first open axial end 35, and a second open axial end 36. Surface 33 is of generally uniform diameter and surface 32 is smoothly finished and of substantially uniform diameter for a purpose subsequently described. Wall 31 may be constructed of aluminum alloy for lightness and, in any event, is relatively thin radially so as, unless reinforced, to be substantially destroyed by deformation and/or rupture when subjected internally to the predetermined fluid pressure supplied by conduit pairs 15.

Each assembly 11 has a first cylinder head 40 mounted on its first tube end 35. The head is of cup-like configuration concave toward tube 30 and has an annular peripheral shoulder 41 which engages tube end 35 and a cylindrical portion 42 extended somewhat within the tube end portion adjacent to end 35. Head portion 42 is slideably fitted to interior tube surface 32 for movement thereof axially of the tube and bears an annular outer groove receiving an O-ring 44. This ring is a fluid seal disposed at head 40 between said portions so that tube 30 is closed in fluid-tight relation by head 40. This head has a bore extending through it so as to provide an internal surface 46 coaxial with the tube and substantially smaller in diameter than tube surface 32. Head 40 has an annular groove outwardly from surface 46, this groove receiving an O-ring 47. Head 40 has an annular boss 49 circumscribing surface 46 and extended from the head coaxially therewith oppositely of tube 30.

Each assembly 11 has a second cylinder head 50 mounted on and closing its tube end 36. The side of head 50 toward tube 30 is constructed similarly to head 40, being cup-shaped and bearing a shoulder 51 and an O-ring 52 so that head 50 is slideably mounted on and closes the tube in fluid-tight relation. Oppositely of tube 30, head 50 has a cylindrical projection 55 coaxial with the tube extended axially therefrom, and having a bore 56 which is adapted to receive pivot 17 so that projection 55 serves to transfer reaction forces due to fluid pressure within the tube and acting on heads 40 and 50 from the assembly to fixed element 16.

Head 50 has a first port 60 extending from the side of this head toward tube 30 to an opening 61 through the exterior of projection 55. This port has one portion coaxially related to tube 30 and opening therein through a counterbore 62 and has another portion extended radially from the one portion to opening 61. Opening 61 is connected in any suitable manner to a selected one of the conduits of the pairs 15 thereof. Head 50 has a second port 65 extending from the side of this head toward tube 30 to another opening 66 through the exterior of projection 55. Port 65 has one portion parallel to the one portion of port 60 but is spaced radially of the tube therefrom and port 65 has another portion extending radially of the tube to opening 66. Assembly 11 has a communication tube 68 fixedly received in counterbore 62 and extended therefrom coaxially of tube 30. Tube 68 is substantially smaller in diameter than tube 30 and terminates oppositely of head 50 in an open end 69 aligned axially with head 40.

Each assembly 11 has a disc-like piston 70 disposed between heads 40 and 50. The piston has a peripheral cylindrical surface slideably fitted to tube surface 32 and provided with an annular groove which receives an O-ring 72 and has a central cylindrical surface which is slideably fitted to the exterior of communication tube 68 and which has an annular groove receiving an O-ring 73. Piston 70 is thus slideably received in tube 30 for movement axially thereof in a path between tube ends 35 and 36. O-ring 72 is extended circumferentially about piston 70 and is engaged in fluid sealing relation with wall 31 so as to substantially prevent fluid leakage therebetween when a pressure difference equal to the predetermined pressure provided by conduit pairs 15 exists across the piston so long as tube surface 32 remains smooth and is of substantially uniform diameter. O-ring 73 is disposed in fluid sealing relation between communications tube 68 and piston 70.

Each assembly 11 has a tubular piston rod 75 extended from piston 70 coaxially with tubes 30 and 68 through and slideably fitted to surface 46 of head 40. Rod 75, typically, is unitarily constructed with the piston so as to move therewith. The rod is hollow for a portion of its length and circumscribes tube 68 so as to receive this tube when the piston is disposed adjacent to head 50. The rod has a length such that, when the piston is so disposed, the rod has a portion extending outwardly of wall 31 and head 40, this portion being solid and having a bore 76 adapted to receive pivot 19. Rod 75 thus serves to transmit movement of the piston to a location exteriorly of wall 31 and it is evident that rods 75 of assemblies 11 are connected externally of the walls thereof so that these rods and the pistons 70 of these assemblies move together toward and from the corresponding cylinder heads 40 and 50 whenever either piston is motivated to move by fluid pressure between it and one of the associated cylinder heads. Rod 75 has a bore 78 extended transversely through it adjacent to piston 70 oppositely of head 50 so that the hollow interior of the rod communicates through bore 78 with the interior of tube 30 between piston 70 and head 40.

Referring to FIG. 2, it is evident that port 65 serves to introduce fluid under pressure, from the conduit connected to this port from the associated one of the pairs 15 within wall 31 between head 50 and piston 70 so as to urge the piston along its path from head 50. It is also evident that port 60, tube 68, the hollow interior of rod 75, and bore 78 serve to introduce fluid under pressure from the other conduit of such pair between head 40 and piston 70 so as to urge the piston along its path from head 40.

Each assembly 11 has a layer 80 of resin impregnated filament wrapped externally about wall 31 of tube 30 and about each of the heads 40 and 50 oppositely of the tube in reinforcing relation to the wall and to the heads so that the tube and the heads withstand forces thereon due to the predetermined pressure of fluid supplied through the conduits of the associated pair 15 thereof and ports 60 and 65 to the interior of the tube between piston 70 and heads 40 and 50. The filament may be of any suitable material and be wrapped in any suitable arrangement about the tube 30 and heads 40 and 50 so as to reinforce the tube against circumferential stress due to fluid pressure therein and prevent deformation of the tube wall 31 sufficient to destroy the sealing relation between this wall and piston 70 provided by O-ring 72 and so as to retain heads 40 and 50 to the tube 30 against forces axially thereof due to fluid pressure therein. The head retaining effect is, of course, most effective if the layer 50 extends from the periphery of each head, respectively, to boss 49 and to projection 56 as shown in FIG. 2. Since, as before stated, tube 30 is relatively thin, it is apparent that resistance of each assembly 11 to circumferential stress therein from fluid pressure is due substantially to layer 80. The layer may consist of a single wrapping as represented in FIG. 2 or may have two or more wrappings in which the filaments extend at different angles to a plane normal to the axis of tube 30. A typical arrangement of two wrappings is represented in FIG. 1 and has an inner wrapping 82 angularly related to such plane and wrapped about the leads 40 and 50 so as to resist circumferential and axial forces and has an axially central outer wrapping 83 at substantially zero degrees to such a plane to resist circumferential forces. The filament angle of such one or more wrappings may be selected, as determined by the diameter to length ratio of tube 30 for example, so as to optimize the relative axial and circumferential strengths of layer 80 and thereby minimize the weight of each assembly 11.

The filament of layer 80 is, preferably, graphite filament because of the relatively high tensile strength of this material in relation to other filament materials and because of the relative brittleness of this material under impact forces. The high tensile strength results in each assembly 11 being relatively light in weight, an important consideration in aircraft applications of actuator 10, and the brittleness is important in providing, in a manner subsequently set forth in detail, resistance of the actuator to jamming due to projectile penetration, an important consideration in combat aircraft. Layer 80, typically, has the graphite filament impregnated with epoxy resin. The resin and the manner of hardening it and impregnating the filament with it may be selected from those well known in the art of composite materials and suited to the practice of the subject invention.

It is evident that each assembly 11 is of relatively light weight since tube 30 and heads 40 and 50 may be constructed of aluminum alloy or other relatively lightweight material and since no other element other than layer 80 is required to retain the heads to the tube and since the layer, which has relatively high tensile strength to weight ratio, resists fluid pressure forces within the assembly. It is also evident that each assembly 11 is inexpensive to manufacture since it has relatively few elements and these are of simple configuration and do not require exotic materials or methods of manufacture. It is apparent that, once layer 80 is wrapped about tube 30 and heads 40 and 50, assembly 11 is substantially permanently assembled since destruction of the layer is required to remove the heads.

Second Form

Figure 3:
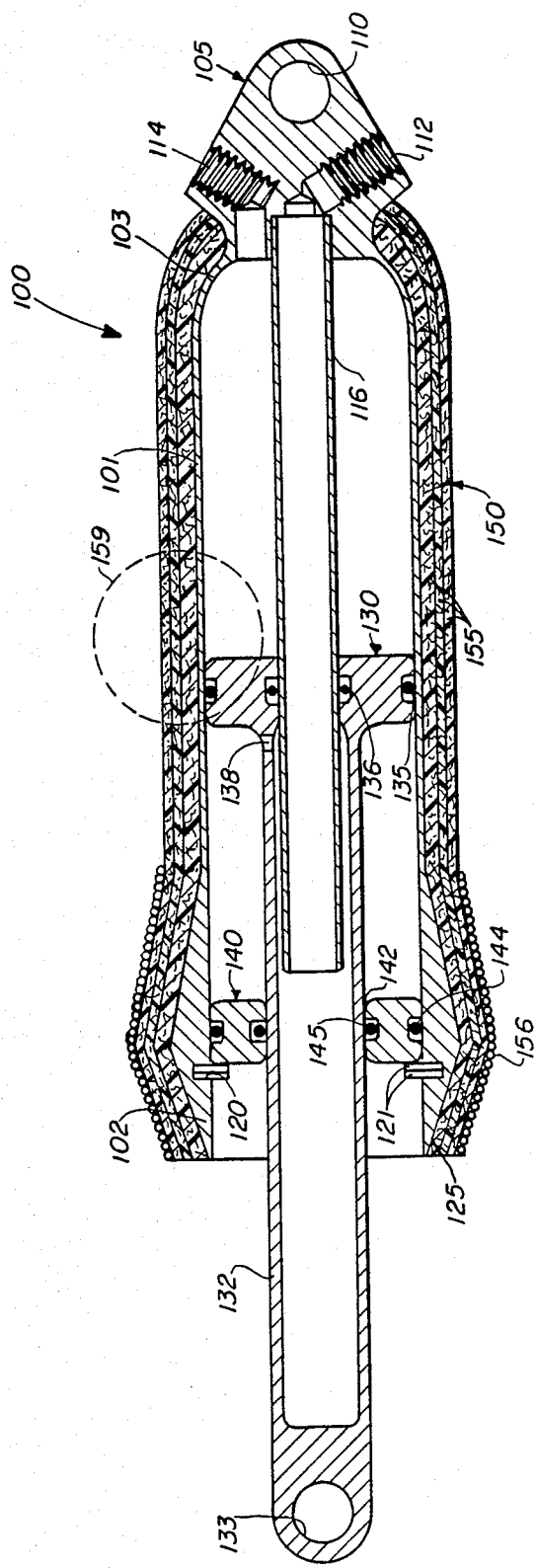
FIG. 3 is a longitudinal section of a second form of cylinder assembly.

Since each assembly 11 is permanently assembled it is apparent that it is not well suited for applications where access to piston 80 and O-rings 47, 72, and 73 is required for repair. A second form of hydraulic cylinder assembly 100, which embodies the principles of the subject invention and is shown in FIG. 3, has the advantage of being fully repairable, nearly as light in weight and economical to manufacture as assembly 11, and as effective in resisting jamming due to projectile penetration.

Assembly 100 has a cylindrical tube 101 having axially opposite end portions 102 and 103. End portion 102 is axially open and, interiorly, is of uniform diameter with the axially central portion of the tube. End 103 is closed by an attachment unit 105 extending transversely of tube 101 and integrally constructed with the balance of the tube and thus permanently connected thereto.

Attachment unit 105 extends axially outwardly from tube 101 and, where unit 105 attaches to the tube, is substantially narrower transversely of the tube than the diameter of the central portion of the tube. Unit 105 has a bore 110 extended transversely of the tube, spaced axially thereof, and corresponding to bore 56 of assembly 11. Unit 105 has a first port 112 having an opening coaxially related to tube 101 and opening there toward and having a screw threaded opening externally of the tube and adjacent to bore 110. Unit 105 has a second port 114 having an opening into the tube at a location spaced radially from the corresponding opening of port 112 and having a screw threaded opening externally of the tube and disposed diametrically oppositely thereof of the screw threaded opening of port 112. A communications tube 116, which corresponds to tube 68 of assembly 11, extends coaxially of tube 111 from port 112 and opens adjacent to end portion 102.

Tube 101 is provided with an internal annular groove 120 at its end portion 102, this groove receiving a pair of snap rings 121 of any suitable construction for a purpose subsequently to be described. Externally and in a direction from its open end towards its closed end, tube 101 increases somewhat in diameter and then decreases in diameter, the largest diameter occurring at a circle circumscribing groove 120. Tube 101 thus bears a generally frusto-conical surface 125 having its base aligned axially with this groove. It is evident that surface 125 circumscribes this tube adjacent to its open end and extends radially outwardly therefrom and faces axially away from closed tube end portion 103.

Assembly 100 has a piston 130 which has substantially the same configuration as piston 70 of assembly 11 in having a hollow piston rod 132 provided with a bore 133 corresponding to bore 76 and in having outer and inner annular grooves provided with O-rings 135 and 136 corresponding to O-rings 72 and 73 and a bore 138 which corresponds to bore 78. Piston 130 is slideable axially within tube 101 and is disposed between end portions 102 and 103 thereof. It is evident that port 112, tube 116, hollow piston rod 132, and bore 138 serve to induce pressured fluid between piston 130 and tube end portion 102 and that port 114 serves to introduce pressurized fluid between the piston and tube end portion 103.

Assembly 101 has a discoidal cylinder head 140 disposed within tube 101 adjacent to the open end thereof and slideably fitted peripherally to the interior of this tube for movement axially therein. The head has a central bore 142 through which piston rod 132 is slideably extended. The periphery of the head bears an annular external groove receiving an O-ring 144 to provide a fluid seal between the head and the interior of tube 101, and bore 142 has an internal annular groove receiving an O-ring 145 to provide a fluid seal between the head and rod 132. The axially opposite sides of head 140 are substantially planar, the one of these sides towards the open end of tube 101 bearing against snap rings 121. These snap rings thus serve to detachably connect head 140 to tube 101 to retain the head therein against forces axially of the tube due to pressurized fluid between the head and piston 130. It is apparent that rings 121 engage head 140 oppositely thereof from closed tube end portion 103 so as to block movement of the head axially from tube 101 due to fluid pressure therein and to transfer forces, which are due to such pressure and which act axially on the head, to this tube at a location thereon adjacent to the open end thereof and to surface 125.

Assembly 100 has a layer 150 of resin impregnated filament wrapped peripherally about tube 101. Layer 150 is extended axially of this tube from the periphery thereof about unit 105, which closes tube end portion 103, and is wrapped about this unit oppositely from the open tube end at tube portion 102. Layer 150 thus serves to reinforce tube 101 to withstand fluid pressure therein and to reinforce unit 105 to withstand such forces axially of the tube. Layer 150 is wrapped about surface 125 and extends therefrom along tube 101 to the closed end portion 103 thereof where the layer, as just described, extends about unit 105 oppositely of tube portion 103 and thus transversely of the tube at its closed end. It is apparent that layer 150 is thus tensioned axially of the tube by axial fluid pressure forces therein transferred in turn to head 140, to snap rings 121, to the enlarged tube portion outwardly of these rings, and to layer 150 by engagement therewith of surface 125, thereby reinforcing tube 101 to withstand forces axially thereof.

Layer 150 preferably includes an inner wrapping 155 depicted as having three layers. Wrapping 155 extends from end to end of tube 101 engaging the periphery thereof including surface 125 and the outer region of the portion of unit 105 which closes open end tube portion 103 The layers of wrapping 155 are constructed of strands, not shown, which are wrapped at an angle to a plane normal to the tube axis and thus extend axially of the tube and reinforce the tube against fluid pressure forces axially thereof. Layer 150 has an outer wrapping 156 wrapped about inner wrapping 155 outwardly of the enlarged portion of tube 101 at open end portion 102 thereof. The strands of outer wrapping 156 preferably are wrapped circumferentially about inner wrapping 155 so as to lie substantially in such a plane and thus retain the inner wrapping in engagement with surface 125 to ensure the transfer of forces axially from this surface to the inner wrapping.

OPERATION

The operation of cylinder assemblies 11 and 100 in normal operation is similar to that of other hydraulic cylinder assemblies and need not by further explained. The operation of assemblies 11 and 100 to provide resistance to jamming when one of either is penetrated by a projectile is substantially identical and will be explained with reference to FIG. 4 wherein the numerals refer to assembly 11 although, as will be apparent, the elements fragmentarily depicted thereon are common to assemblies 11 and 100, FIG. 4 representing the regions within the dash circles 159 in FIGS. 2 and 3.

Figure 4:
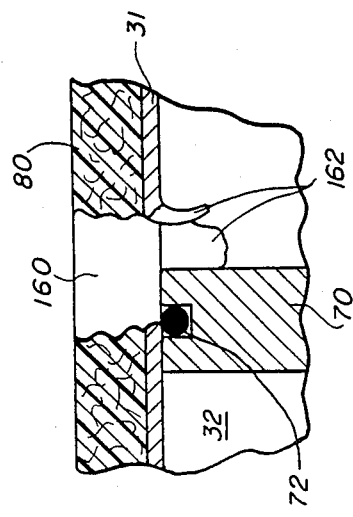
FIG. 4 is a fragmentary section at either of the areas enclosed by a dash circle in FIG. 2 or FIG. 3 showing the corresponding assembly subsequent to penetration thereof by a projectile.

In FIG. 4, numeral 160 indicates damage due to a projectile, not shown, which has penetrated layer 80 and tube wall 31 and deformed the wall so as to form from the material thereof a plurality of projections or petals 162 which extend inwardly of the wall into the path of piston 70 Since the graphite filaments of layer 80 are, as noted above, relatively brittle, this layer is effectively disintegrated by impact of a projectile at the usual velocities likely to damage a combat aircraft and does not form fragments of sufficient size to jam piston 70. Since wall 31 is relatively thin and is constructed of relatively weak material, as described above, successive engagement of piston 70 of one of the assemblies 11 of actuator 10 with petals 162 when the piston is urged toward such petals by force due to fluid pressure acting on the piston of the other of the assemblies 11, shears the petals successively from the wall 31 from which the petals were formed, thereby detaching the petals from the wall so that subsequent movement of the piston is not jammed by the petals. As depicted in FIG. 4, petals at the left side of damage 160 have been already detached by piston 70 which is represented as moving from left to right to detach the balance of the petals. It is apparent that the thickness and material of wall 31 may be such that petals may be detached therefrom by a force which acts on a piston 70 and which is substantially less than an axial clearing force produced on the piston by a predetermined fluid pressure supplied through conduit pairs 15.

EXAMPLE

A cylinder assembly similar to one of the assemblies 11 was constructed using 775 T6 aluminum alloy for a tube wall corresponding to wall 31 and using high modulus graphite fiber in a layer corresponding to layer 80. The wall was 0. 0050 inches (0.127 mm) in thickness; the internal diameter of the tube formed by the wall was three inches (76.2 mm); and the thickness of the wrapping radially of the wall was 0.25 inch (6.35 mm). The example cylinder assembly was designed to operate with a nominal hydraulic fluid pressure of 3000 psi (8797 kg/cm$^2$) so as to provide a nominal actuating force in the neighborhood of 18,850 lbs (8568 kg) with a piston rod, corresponding to rod 75, of 1 inch (25.4 mm) diameter, the example assembly being designed to withstand fluid pressures of 10,000 psi (29,300 kg/cm$^2$).

The example assembly was penetrated radially by a 0.50 caliber (12.7 mm) projectile and it was found that a force acting on the piston rod of the example assembly of less than 2000 lbs (909 kg), or about 10 percent of the actuation force provided by one of the example actuators, was sufficient to clear the damage produced by the projectile. It is believed that such petal forming damage due to projectile penetration of the example assembly, when utilized in dual assembly actuator similar to actuator 10, can be cleared without jamming when penetrated by projectiles of up to 25 mm diameter.

Obviously many modifications and variations of the present invention are possible in light of the above teachings. It is, therefore, to be understood that, within the scope of the appended claims, the present invention may be practiced other than as specifically described.

What is claimed is:

1. A cylinder assembly for use in an actuator resistant to damage by a projectile and for use with fluid at a predetermined pressure the assembly comprising:
   a cylindrically tubular wall having axially opposite and open ends, said wall being substantially destroyable when subjected internally to said pressure without reinforcement;
   a piston received within the wall and slideably fitted therein for movement in a path between said ends;
   a first head mounted on one of said ends in fluid tight relation thereto and having an internal cylindrical surface extended therethrough, said surface being axially parallel to said wall and substantially smaller in diameter than said wall, said first head having a portion slideably fitted to the corresponding end of said wall for movement axially thereof;
   a second head mounted on the other of said ends in fluid tight relation thereto, said second head having a portion slideably fitted to the corresponding end of said wall for movement axially thereof;
   a rod connected to the piston for movement therewith and extended axially of the tube through said surface of the first head and slideably fitted thereto;
   port means for introducing fluid at said pressure within the wall between each of said heads and the piston to urge the piston from said heads along the path;
   means extended circumferentially about the piston and engaged with the wall in fluid sealing relation for
   substantially preventing leakage therebetween of fluid at said pressure;
   a pair of fluid seals individual to the heads and disposed between each of said portions thereof and the corresponding end of said wall;
   means mounted on one of the heads and extended therefrom axially of said wall for transferring reaction forces due to fluid pressure between the piston and the heads from the assembly; and
   a layer of resin impregated filament wrapped externally about the wall in reinforcing relation thereto so that the wall and said layer together withstand said pressure without deformation of the wall sufficient to destroy said sealing relation,
   the wall being relatively thin radially and constructed of such material that a projection, which extends internally of said wall and is formed therefrom by penetration thereof by a projectile, is detachable from said wall by engagement by the piston with a clearing force substantially less than the axial force produced on the piston by said pressure; said filament being of material which is relatively brittle so that said layer substantially disintegrates upon impact by the projectile so that fragments of the layer formed by such impact are of insufficient size to prevent movement of the piston due to said clearing force; and said layer of resin impregnated filament being wrapped about each of said head oppositely of said wall to retain said heads thereon against forces axially of said wall due to said pressure therein.

* * * * *

UNITED STATES PATENT AND TRADEMARK OFFICE
CERTIFICATE OF CORRECTION

PATENT NO. : 4,867,044
DATED : Sep. 19, 1989
INVENTOR(S) : John W. Holtrop

It is certified that error appears in the above-identified patent and that said Letters Patent is hereby corrected as shown below:

Column 8, delete lines 35 - 39 and substitute:

-- means extended circumferentially about the piston and
    engaged with the wall in fluid sealing relation
    for substantially preventing leakage therebetween of
    fluid at said pressure; --.

Column 8, at line 64, delete "head" and substitute -- heads --.

Signed and Sealed this

Seventh Day of August, 1990

Attest:

HARRY F. MANBECK, JR.

*Attesting Officer*  *Commissioner of Patents and Trademarks*